SAMUEL BROCK, OF NEW ORLEANS, LOUISIANA.

Letters Patent No. 89,121, dated April 20, 1869.

IMPROVED COMPOSITION FOR PREVENTING THE INCRUSTATION OF STEAM-BOILERS.

The Schedule referred to in these Letters Patent and making part of the same.

*To all whom it may concern:*

Be it known that I, SAMUEL BROCK, of the city of New Orleans, parish of Orleans, State of Louisiana, have invented a new and useful Means and Composition of Ingredients for the Removal and Prevention of Incrustation in Steam-Boilers, and other vessels used and employed for heating and evaporating water for any purpose; and I do hereby declare that the following is a full and exact description thereof, which will enable others skilled in the art to make and use the same.

My invention consists in the compounding, mixing, and combination of the following ingredients, substantially in the manner and in the proportions following; that is to say:

First, *Terra Japonica catechu*, or any other vegetable product containing tannin.

Second, The carbonate of sodium, or its equivalent.

Third, The nitrate of potassa, or the common nitrate of commerce.

Fourth, The carbonate of ammonia.

Fifth, Linseed, cotton-seed, rape-seed, oil-cake, or other oil-cake containing a fixed vegetable oil in small quantities, and starch, or in case such ingredient cannot be obtained, then corn-meal, wheat-bran, or other vegetable product, containing starch in its composition.

That the said ingredients are incorporated and compounded in my invention in substantially the following manner, and in the following proportions; that is to say, To twenty parts, by weight, of said first-named ingredient, (*Terra Japonica catechu* of commerce,) or other vegetable product containing an equivalent of tannin, I add forty parts, by weight, of the carbonate of sodium, six parts, by weight, of the nitrate of potassa, or common nitre, and four parts, by weight, of the nitrate of ammonia. To which I add the oil-cake, corn-meal, or wheat-bran, or other vegetable product above described, in the quantities and in the manner hereinafter set forth.

In order to mix and incorporate said ingredients, and produce said composition, I first dissolve the several ingredients, (except the oil-cake, or last-mentioned ingredient, containing starch and vegetable oil,) in a sufficient quantity of water to cause a perfect solution thereof; and after causing the several ingredients to be thoroughly mixed in solution, I add linseed, cotton-seed, rape-seed, or other oil-cake, or other vegetable product, in powder, containing starch, above described, and thoroughly incorporate and mix the same in such quantity, with or without the use of heat, as to cause the composition to assume and attain the consistency of a thick paste.

In order to apply my said invention to the purpose of removing incrustation, and preventing the deposit and formation thereof in steam-boilers, and other vessels employed to heat or evaporate water, I cause to be introduced in said boiler or other vessel, by means of the safety-valve manhole-pumps, or by any other convenient means, at intervals of five or six days, a quantity of said composition equal to one ounce to each five-horse power capacity of the boiler, and allow the same to remain in solution in the water contained in said boiler.

The amount of the composition introduced, and the frequency of its introduction, to be varied and governed according to the character of the water and the amount of pressure in the boiler.

Having thus described my invention,

I claim as new, and desire to secure by Letters Patent—

1. The composition above described, composed of the ingredients above described, compounded and used in the manner, proportions, and for the purposes substantially as above set forth.

2. The use of said composition for the removal and prevention of scale and incrustation in steam-boilers, or other vessels used for heating and evaporating water, substantially as above set forth.

SAMUEL BROCK.

Witnesses:
 A. HERO, Jr.,
 J. N. BECKWITH.